Sept. 11, 1962 B. E. MILLS 3,053,168
BREWER FOR COFFEE DISPENSING MACHINES
Filed Nov. 10, 1958 6 Sheets-Sheet 1

INVENTOR.
BERT E. MILLS
BY
ATTYS.

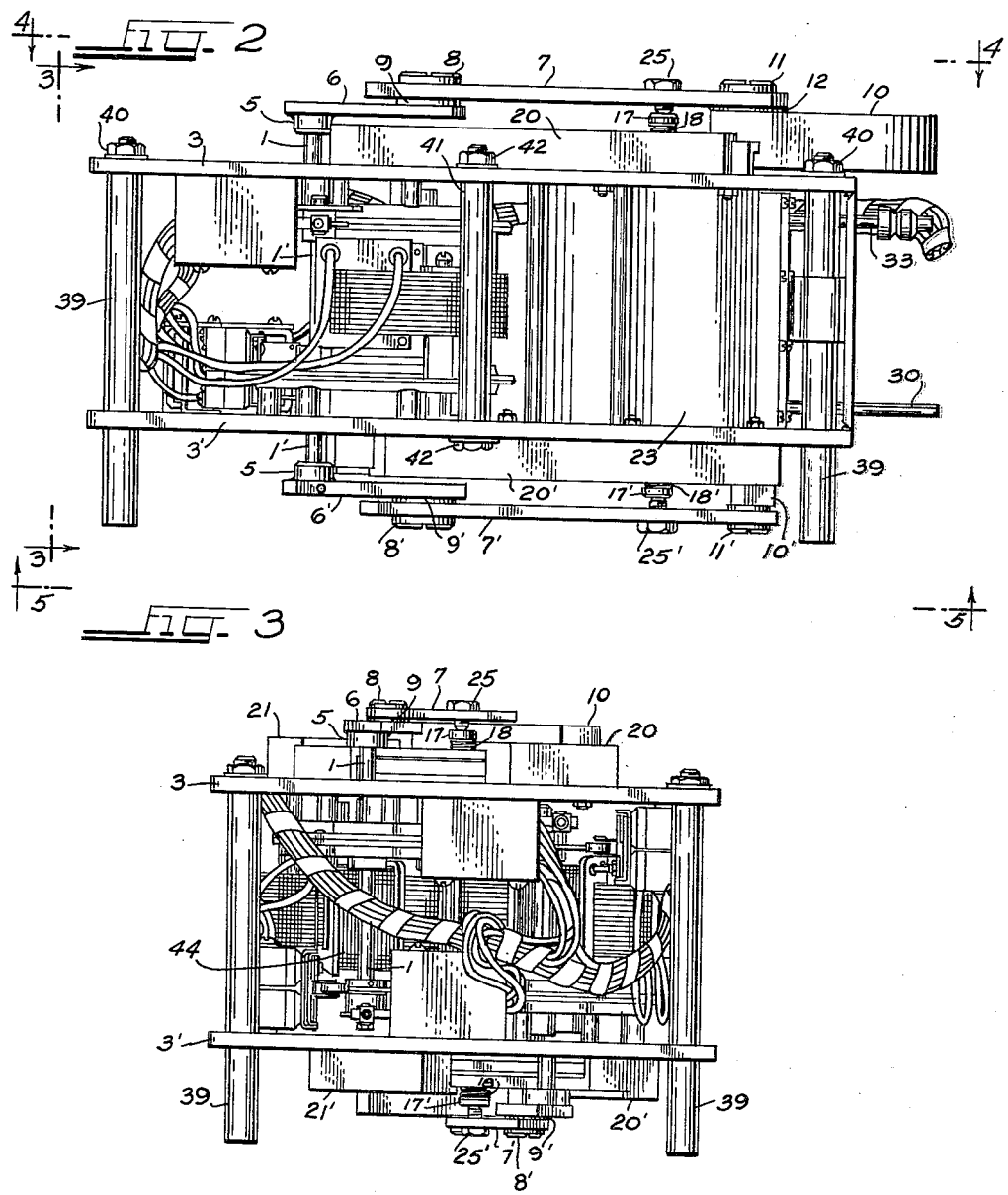

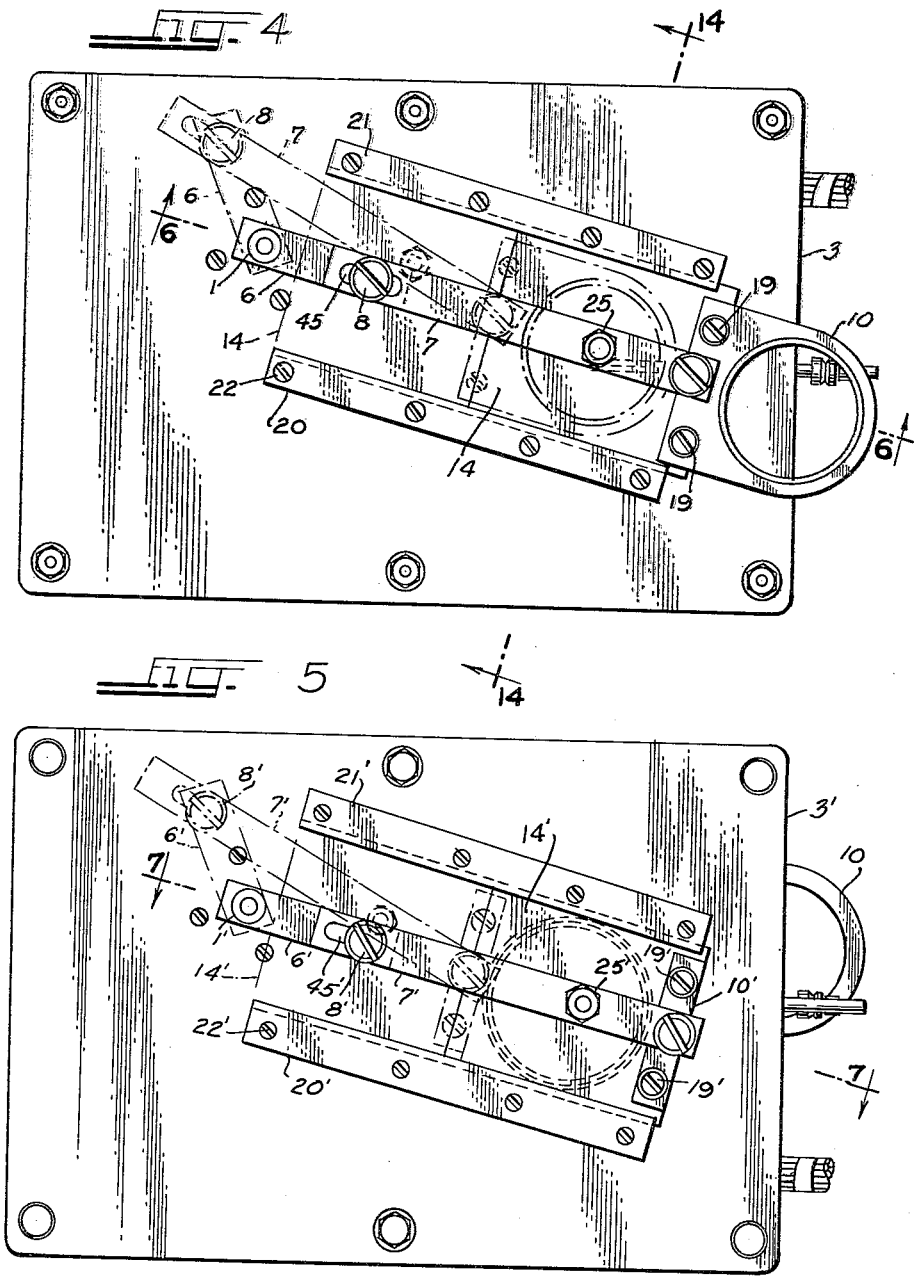

Sept. 11, 1962  B. E. MILLS  3,053,168
BREWER FOR COFFEE DISPENSING MACHINES
Filed Nov. 10, 1958  6 Sheets-Sheet 4
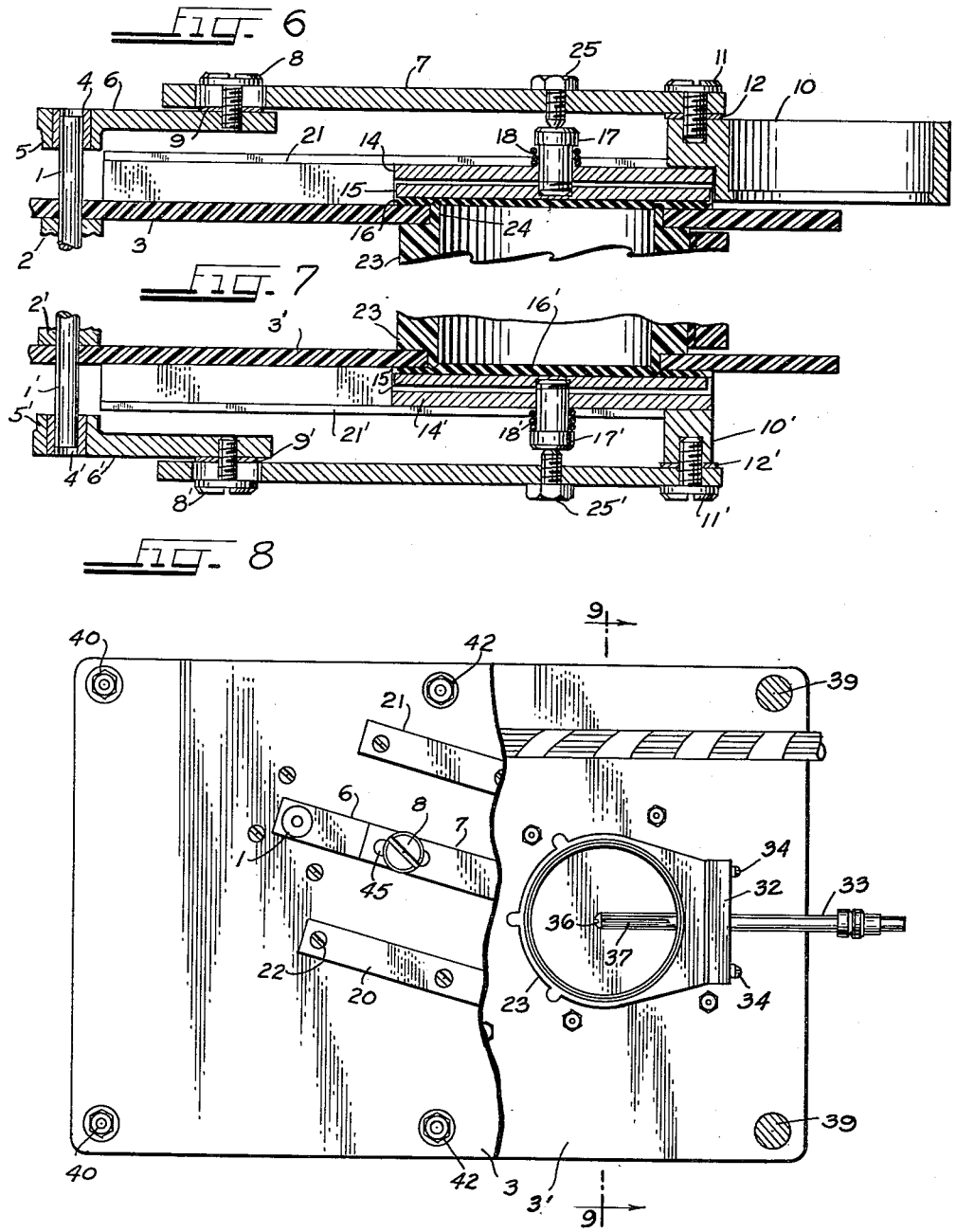
INVENTOR.
BERT E. MILLS
BY
ATTYS.

Sept. 11, 1962     B. E. MILLS     3,053,168
BREWER FOR COFFEE DISPENSING MACHINES
Filed Nov. 10, 1958     6 Sheets—Sheet 5
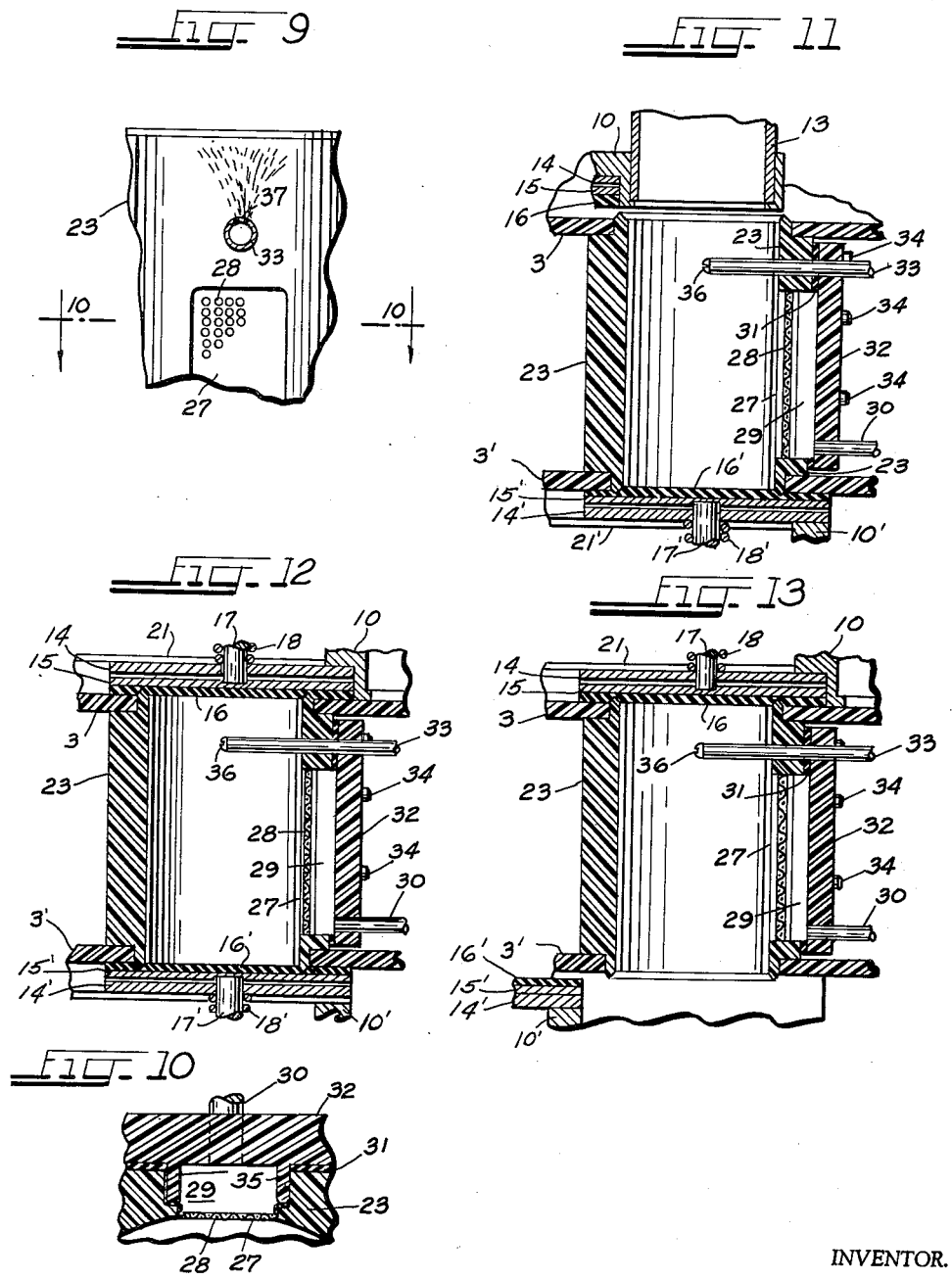
INVENTOR.
BERT E. MILLS
BY
ATTYS.

Sept. 11, 1962 B. E. MILLS 3,053,168
BREWER FOR COFFEE DISPENSING MACHINES
Filed Nov. 10, 1958 6 Sheets-Sheet 6
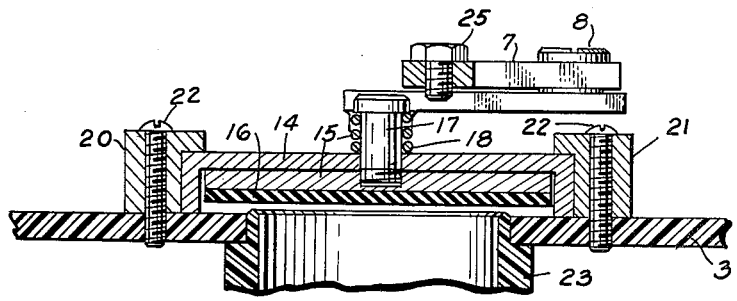
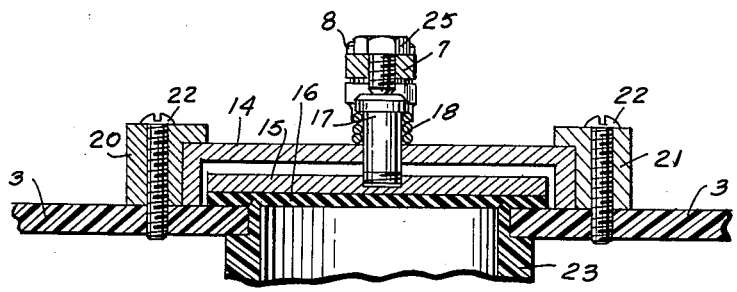
INVENTOR.
BERT E. MILLS

United States Patent Office 3,053,168
Patented Sept. 11, 1962

3,053,168
BREWER FOR COFFEE DISPENSING MACHINES
Bert E. Mills, St. Charles, Ill., assignor, by mesne assignments, to The Seeburg Corporation, Chicago, Ill., a corporation of Pennsylvania
Filed Nov. 10, 1958, Ser. No. 772,983
15 Claims. (Cl. 99—289)

This invention relates to a brewer chamber and to associated slides for sealing said chamber for use in conjunction with a fresh brew coffee dispensing machine.

The primary object of this invention is to provide apparatus for sealing the upper and lower ends of the brewer chamber such that said chamber can be alternately opened and tightly sealed in a simple manner by automatic means and such that said apparatus will, when in its sealed position, provide a highly effective seal without causing any damage or any appreciable wear to the end of the brewer chamber being sealed.

A further object of this invention is to provide a device for emitting water within said brewer chamber such that said water will be sprayed in a uniform manner over the ground coffee within said chamber so as to provide a homogeneous and effective mixing of the water and the ground coffee within said chamber.

A still further object of this invention is to provide a screened outlet in said brewer chamber so as to permit the brewed coffee to be removed from the chamber while the coffee grounds are retained therein and which is so arranged that said screened outlet can be easily cleaned without being removed from said chamber.

Other objects and advantages of this invention will be apparent from the following description of a preferred embodiment thereof, taken together with the accompanying drawings, in which:

FIG. 2 is a side elevational view of the brewer assembly showing the upper and lower slides in the sealed position.

FIG. 3 is an end elevational view taken along the line 3—3 of FIG. 2.

FIG. 4 is a top plan view of the brewer assembly taken along the line 4—4 of FIG. 2.

FIG. 5 is a bottom view of the brewer assembly taken along the line 5—5 of FIG. 2.

FIG. 6 is a fragmentary sectional view taken along the line 6—6 of FIG. 4 illustrating in particular the upper slide and the linkage for operating said slide.

FIG. 7 is a fragmentary sectional view taken along the line 7—7 of FIG. 5 and illustrating in particular the lower slide and the linkage for operating said slide.

FIG. 8 is a top plan view, partly broken away, illustrating in particular the brewer chamber, the water inlet tube, and the narrow slit in the upper end of said tube.

FIG. 9 is a fragmentary sectional view taken along the line 9—9 of FIG. 8 and illustrating in particular the screen outlet in the brewer chamber, the water inlet tube with a narrow slit in the top thereof, and the manner in which water is sprayed into said brewer chamber.

FIG. 10 is a sectional view taken along the line 10—10 in FIG. 9 illustrating in particular the brewed coffee outlet tube, the screen between the brewer chamber and said outlet tube, and the manner in which said screen is held in position within said brewer chamber.

FIG. 11 is a fragmentary sectional view taken along the line 6—6 of FIG. 4 but with the upper slide shown open with the coffee inlet funnel in loading position and the bottom slide shown sealed, thus illustrating in particular the position of the upper and lower slides at the time the ground coffee is supplied to the brewer chamber.

FIG. 12 is a view similar to FIG. 11 but with the upper and lower slides shown in the sealed position thus illustrating the position of these slides at the time water is being sprayed into the brewer chamber onto the ground coffee and the brewed coffee is being removed through the screened outlet tube.

FIG. 13 is a view similar to FIG. 11 but with the upper slide shown in the sealed position and the lower slide shown in the open position thus illustrating in particular the position of these slides at the completion of the brewing cycle when the spray of water is temporarily continued so as to clean the interior of the brewer chamber.

FIG. 14 is a fragmentary sectional view shown along the line 14—14 of FIG. 4 illustrating the upper and lower portions of the slide, the slide screw, and the slide rails, the lower portion being shown held in its uppermost position by the slide screw spring.

FIG. 15 is a view similar to FIG. 14 but the lower portion of the slide is shown separated from the upper portion due to a downward force which is being applied to the slide screw.

Figure 1:
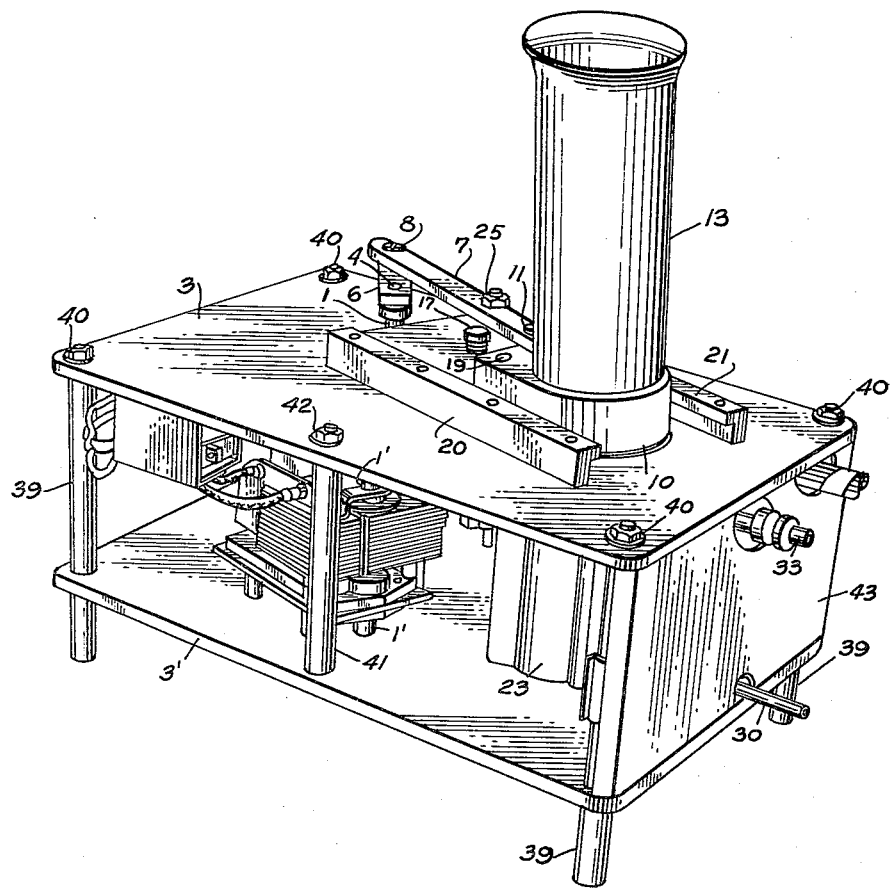
FIG. 1 is a perspective view of the brewer assembly and coffee loading funnel which is shown mounted in the loading position on the top of said assembly, the upper slide being shown in the open position.

Before describing in detail the coffee brewer assembly illustrated in the drawings and embodying the present invention it may be well to describe the sequence of operations that take place during a brewing cycle. At the end of a brewing cycle the upper slide will be sealed and the bottom slide open as shown in FIG. 13 and thus when a new cycle is begun the bottom slide will be sealed and the upper slide opened as shown in FIG. 11. Ground coffee is then supplied to the brewer chamber through the open upper end of said chamber so as to fill approximately two-thirds of the chamber. The ground coffee having been supplied to the chamber the upper slide is then closed so that the brewer chamber is tightly sealed at its upper and lower ends as shown in FIG. 12. Hot water is then supplied to said chamber under pressure by being sprayed through the narrow slit at the top of the water inlet tube (see FIG. 9) such that said water is thoroughly mixed with the ground coffee and such that the brewed coffee will be forced out through a screen and through the coffee outlet tube to a storage container from which it can be drawn as needed.

A predetermined amount of ground coffee and water are used during a single brewing cycle so that a predetermined amount of fresh brew coffee, for example 10 cups, will be produced during such brewing cycle. When the predetermined amount of coffee has been produced and delivered to the storage container then the bottom slide is opened (see FIG. 13) and the flow of hot water is continued for a short time with said bottom slide open, such that the interior of the brewer chamber will be cleaned in preparation for the next cycle. After the cleaning is completed the water is shut off and the brewer remains idle until more coffee is required. When more coffee is required the cycle, as above-described, is repeated. All of the steps in the above-described brewing cycle can be performed manually or automatically as will hereinafter be more fully explained.

Referring first to FIG. 6 the upper slide drive shaft 1 is mounted in a bearing 2 and driven by the upper slide drive motor (shown at 44 in FIG. 3). The upper slide drive shaft 1 passes through the brewer top plate 3 and is fixedly mounted in the bushing 4 and hub 5 of the upper slide crank 6 such that rotation of the shaft 1 will cause rotation of the crank 6 about the axis of the shaft. The slide crank 6 is attached to the upper slide link 7 by means of the link screw 8, and a washer 9 is inserted between the crank 6 and the link 7 so as to maintain a predetermined distance between them and such that when the crank 6 is caused to rotate about the axis of the shaft 1 only linear forces will be transferred to the link 7 through the screw 8. The slide link 7 is attached to the upper slide block 10 by means of a screw 11 and a washer 12 is inserted between the link 7 and the upper slide block 10. It should be noted that the upper slide block 10 is provided with a rounded extension which can be used to mount a coffee loading funnel 13 as shown in FIG. 1. The upper slide consists principally of two separate parts, the upper slide channel 14 being the upper portion, and the upper slide pressure plate 15 on which is mounted a sheet of synthetic rubber 16, being the lower portion.

The channel 14 and the manner in which the pressure plate 15 is contained within said channel is best illustrated in FIGS. 14 and 15. A screw 17 extends through the channel 14 and is connected to the pressure plate 15 (see FIG. 6) such that the pressure plate can be moved upward or downward with respect to the channel by moving the screw in the desired vertical direction. A spring 18 is positioned on the screw 17 such that if no downward force is applied to the screw then the pressure plate will rest in its uppermost position and thus be in contact with the slide channel as shown in FIG. 14. If a downward force is applied to the screw 17 then the pressure plate will be moved downward with respect to the slide channel as shown in FIG. 15.

The upper slide block 10 is fastened to the slide channel 14 by means of two screws 19 (see FIG. 4) such that any horizontal motion imparted to the slide block 10 by the link 7 will also be imparted to the channel 14 and thus to the pressure plate 15. Two rails 20 and 21 (see FIG. 4) are fastened to the brewer top plate 3 by means of eight screws 22 such that the channel 14 and pressure plate 15 can be moved along said rails and be guided by them. The brewer chamber 23 has an upper extension 24 (FIG. 6) which extends through and slightly above the brewer plate 3. It is important that the brewer chamber extend above the plate 3 rather than be flush with said plate so that the upper end of the chamber can be effectively sealed.

It is also important to note that if no downward force is being applied to the slide screw 17 then the spring 18 will cause the pressure plate 15 to rest in its uppermost position in contact with the channel 14 such that if the channel and pressure plate are slid back and forth within the slide rails 20 and 21 there will be clearance between the synthetic rubber seal 16 and the upper edge of the brewer chamber extension 24. Because of this clearance it is possible to move the channel and pressure plate into the sealing position directly above the brewer chamber without any contact between the synthetic rubber seal and the upper edge of the brewer chamber, thus avoiding damage and wear with respect to both of these elements. Once the channel and pressure plate are in the sealing position it is possible to provide a tight and effective seal by applying a downward force on the slide screw 17 as will hereafter be more fully explained.

It will now be understood that if the upper slide power shaft 1 is rotated so that the crank 6 and link 7 are in the position shown by the solid lines in FIG. 4 then the channel and pressure plate will cover the upper end of the brewer chamber 23 and thus be in the sealed position as shown, for example, in FIG. 6. It will also be understood that if the power shaft 1 is rotated so that the crank 6 and the link 7 are in the position shown by the dashed lines in FIG. 4, then the upper slide channel and the pressure plate will be in the open position as shown in FIGS. 1 and 11. The link 7 has a slot 45 (see FIG. 4) to accommodate the screw 8 and thus a certain amount of free motion is provided for the power shaft and crank so as to avoid undue resistance to the driving means, e.g. motor 44, at the beginning of a cycle.

As previously explained, when the pressure plate 15 is being slid into the sealing position it slides above the upper edge 24 (FIG. 6) of the brewer chamber and does not contact said edge. However, it can be seen that when the sealing position is reached an adjusting screw 25, which is screwed in the upper slide link 7 so as to project a predetermined distance beneath said link, will be in a position directly above the slide screw 17. Thus the amount by which the screw 25 projects downward is adjusted such that as it passes over the slide screw 17 it will contact the latter and exert a predetermined downward force thereon. This downward force will overcome the force exerted by the spring 18 and will cause the pressure plate 15 to be pressed down securely against the upper edge 24 of the brewer chamber 23 so as to effectively seal the upper end of said chamber.

The pressure plate thus provides a tight and highly effective seal and yet while it is being moved into the sealing position it makes no contact with the upper edge of the brewer chamber and thus avoids the wear and damage to the pressure plate and brewer chamber that would otherwise result if there were rubbing or scraping between these two parts during the sealing operation. The amount by which the screw 25 projects downwardly is adjustable so that the downward force exerted by it upon the slide screw 17, and thus the sealing pressure, are easily adjusted to the desired amount.

The lower end of the brewer chamber is sealed and unsealed in the same manner as described above. FIG. 7 illustrates the lower slide and its associated elements which are identical in all respects to those shown in FIG. 6 for the upper end except for the fact that the lower slide block 10' does not have the large rounded extension as does the upper slide block 10, which is used to mount a coffee loading funnel (see FIG. 1). The lower slide and its associated elements are designated by the same numerals as the corresponding elements at the top of the brewer but with prime markings.

The interior of the brewer chamber 23 is cylindrical in shape as shown in FIG. 8. It has a flat exterior surface on one side and a large rectangular outlet opening is formed in this surface, said opening being screened so that the fresh brew coffee can be removed from the chamber while the coffee grounds are contained therein. Referring to FIGS. 9 and 11, this opening 27 is covered by the screen 28 such that the coffee grounds cannot pass through it but the fresh brew coffee is free to pass through the screen 28 into the space 29 and out through the coffee outlet tube 30 to a storage container (not shown).

In assembling the brewer chamber 23 the screen 28 is placed in position over the opening 27 and the gasket 31 and outlet cap 32, which holds the coffee outlet tube 30 and hot water inlet tube 33, are placed in position and the cap 32 is attached to the flat exterior surface of the brewer by means of eight screws 34. The water inlet tube extends to the interior of the brewer chamber (see FIG. 11) but the coffee outlet tube 30 is flush with the inside surface of the outlet cap 32. Two projections 35 (see FIG. 10), which are integral with and project from the inside of the outlet cap 32, extend vertically for the length of the screen 28 and hold said screen securely in position over the opening 27.

The end of the water inlet tube 33 is closed by a small screw 36 which can be removed when desired in order that the interior of the tube 33 can be easily cleaned. The end being thus closed off the incoming hot water is sprayed into the brewer chamber through the narrow slit 37 (see FIGS. 8 and 9). It has been found that if the water is sprayed directly downward onto the ground coffee, or if it is ejected through an open end of the tube 33, the water will not properly mix with the ground coffee and satisfactory fresh brew coffee will not be produced. Experimentation has shown that in order to achieve a proper mixing of the water and the coffee it is important to spray the water upwards through a narrow slit as indicated in FIG. 9.

The screened outlet by which the fresh brew coffee is removed from the brewer chamber is positioned on the side of the brewer chamber rather than at the bottom. When the screen is in the usual horizontal position at the bottom of the chamber it becomes clogged with coffee grounds and is difficult to maintain in a clean condition. However, when the coffee outlet and screen are arranged as described above the latter can be effectively cleaned by simply continuing the spray of water for a short time after the bottom slide has been opened. The water inlet slit 37 extends lengthwise along the upper surface of the tube 33 (see FIG. 8) and it will be understood from viewing FIG. 9 that a substantial portion of the upwardly directed spray therefrom will (upon being deflected by the upper slide or upon falling by gravity) impinge and wash the inner wall of the chamber 23 and the screen 28 which is substantially flush therewith. In this manner any particles collecting on the screen are easily washed off by the water spray and carried by such spray and by gravity out of the lower end of the chamber.

FIGS. 1–3 illustrate the brewer assembly. Referring to FIG. 1 it will be noted that the brewer chamber 23 stands vertically between two horizontal plates, the top brewer plate 3 and the bottom brewer plate 3'. The chamber is held in position between these two plates because the upper end of the chamber extends through a hole provided in the top plate 3 so as to project slightly above the top surface of said plate (see FIG. 11) and the lower end of the brewer chamber extends through a hole provided in the bottom plate 3' and projects slightly below the bottom surface of said plate. These projections not only serve to hold the chamber 23 in its proper position but they are also an important feature with respect to sealing as has been previously mentioned. The top plate 3 and bottom plate 3' are joined by four corner columns 39 which are fastened to the top plate by the nuts 40 and which extend through holes provided in the bottom plate 3' so as to project somewhat below said bottom plate and thus form legs for the assembly to stand on. The upper and lower plates are also connected by two side columns 41 which are fastened to both the top and bottom plates by the nuts 42 (see FIG. 2).

The water inlet tube 33 (FIG. 1) and the fresh brew coffee outlet tube 30 project through holes provided in the end plate 43. The upper slide drive shaft 1 (FIG. 3) projects downwardly through the top plate 3 into the area between the plate 3 and the plate 3' where it can be driven by an electric motor, if desired, as will be more fully explained hereinafter. The lower slide drive shaft 1' projects upwardly in a similar manner as shown in FIG. 2 and can also be driven by an electric motor, if desired. The coffee loading funnel 13 (FIG. 1) is mounted in the circular extension of the upper slide block 10.

Though it is not essential for utilization of this invention yet it is possible to perform all of the steps of the brewing cycle by automatic means. Electrodes or other standard means of measuring a liquid level may be used to measure the level of coffee in the storage container (not shown) such that when the coffee is down to a predetermined level an electrical signal will actuate the upper slide motor (indicated at 44 in FIG. 3) so as to open the upper slide and so position the coffee funnel 13 that it is in alignment with the open upper end of the brewer chamber 23.

By use of standard control methods such as cams on the upper and lower slide power shafts and cam operated electrical switches the motors can be shut off automatically when the slides have reached the proper position. By similar standard automatic means the lower slide can be closed and sealed by a lower slide motor. At this time the brewer would be in a position to receive a predetermined amount of ground coffee which can be dropped into the funnel 13 by automatic dispensing means or which can be measured and fed in by hand. If the ground coffee were supplied manually the funnel 13 would not be necessary. After the chamber is supplied with ground coffee the upper slide motor would be actuated so as to close said slide and seal the upper end of the chamber 23. With both ends of the chamber sealed hot water would then be supplied under pressure to the water inlet tube 33 and sprayed uniformly over the ground coffee by means of the narrow slit 37 (FIG. 9). The water mixes with the ground coffee and the fresh brew coffee flows out through the screen 28 and then out through the outlet tube 30 to the storage container (not shown). When the level of coffee in the storage container reaches a predetermined level the electrodes, or other liquid level measuring means being used, would signal this and the lower slide motor would be actuated so as to open the lower end of the chamber 23 and the flow of water to the chamber would be shut off. If, however, the flow of hot water is continued for a few seconds after the lower slide has been opened the grounds and other matter in said chamber will be thoroughly washed out so as to prepare the chamber for the next brewing cycle.

A detailed description of the electrical controls which would be necessary to effect completely automatic operation of the coffee brewer has not been attempted herein since such means are well known and no invention is claimed in such automatic controls, but it should be noted that the coffee brewer described herein and embodying the present invention is readily adaptable to automatic operation if desired.

This invention can, of course, be applied in various ways and the present description should therefore be regarded as disclosing only an illustrative embodiment of the invention from which no unnecessary limitations should be implied.

I claim:

1. A coffee brewer for coffee vending machines and the like comprising: a brewer chamber open at its upper and lower ends, said chamber having a water inlet and a liquid coffee outlet therein; means for sealing said upper end of said chamber when coffee is being produced in said chamber; means for opening said upper end when ground coffee or the like is being supplied to said chamber, said sealing and opening means including a slide which can be moved into an open position so as not to cover said upper end and which can be moved into a sealing position so as to cover said upper end, said slide consisting of an upper portion and a lower portion which are so arranged that the lower portion is movable in a vertical direction with respect to said upper portion, and said lower portion having an upwardly projecting extension thereon; means for holding said lower portion above the upper end of the chamber when said slide is being moved into the sealing position such that said lower portion will not contact said upper end; means for moving said slide into said open and said sealing positions, said moving means including a link affixed to said slide and arranged so that after said link has moved said slide into the sealing position said link will engage said extension and force said lower portion downwardly so as to seal said upper end; and means for closing and sealing the lower end of said chamber when coffee is being produced therein and for opening said lower end when said chamber is being washed out.

2. A coffee brewer for coffee vending machines and the like of the type described in claim 1 where the upwardly projecting extension on said lower portion comprises a slide screw which is attached to said lower portion and extends upward through said upper portion, said screw having a head at its upper end and a spring which is positioned between said head and said upper portion such that said spring will maintain said lower portion in its uppermost position so as to be in contact with said upper portion unless a downward force is applied to said screw to overcome the force of said spring.

3. A coffee brewer for coffee vending machines and the like of the type described in claim 2 where said link has an adjusting screw mounted therein so as to project below the lower edge thereof whereby when said link has moved said slide into the sealing position said adjusting screw will be in a position directly above said slide screw so as to exert a downward force thereon thus sealing said lower portion against the upper edge of said brewer chamber.

4. A coffee brewer for coffee vending machines and the like of the type described in claim 1 where said slide is contained between two guide rails which guide said slide in a straight horizontal path as said slide is being moved into said open or said closed position by said opening and closing means.

5. A coffee brewer for coffee vending machines and the like comprising: a brewer chamber open at its upper and lower ends; means for alternately sealing and opening said upper and lower ends; a water inlet and a liquid coffee outlet in said chamber, said liquid coffee outlet including a screened opening in the side of said chamber, said screen being disposed vertically in the wall of said chamber such that when hot water is being supplied to said chamber while said lower end is open any particles clinging to said screen will be easily washed out through said lower end by said water and by gravity; and means for supplying hot water to said chamber.

6. A coffee brewer for coffee vending machines and the like comprising: a brewer chamber open at its upper and lower ends; means for alternately sealing and opening said upper and lower ends; a water inlet and a liquid coffee outlet in said chamber, said water inlet consisting of a horizontally disposed hollow tube positioned towards the upper end of said chamber and having a closed end, which end extends through an opening in the side of said chamber and projects into the interior thereof, said tube having a narrow slit extending lengthwise along its upper surface such that when water is supplied to said chamber through said tube said water will be sprayed upwards towards the top of said chamber, and said liquid coffee outlet including a screened opening in the side of said chamber, said screen being disposed vertically in the wall of said chamber such that when water is being supplied to said chamber while said lower end is open any particles clinging to the screen will be easily washed out through the lower end by said water and by gravity; and means for supplying water to said chamber.

7. A coffee brewer for coffee vending machines and the like of the type described in claim 1 in which said liquid coffee outlet includes a screened opening in the side of said chamber the screen being disposed vertically in the wall of said chamber such that when water is being supplied to said chamber, while said lower end is open, any particles clinging to the screen will be easily washed out through the lower end by said water and by gravity; and means for supplying water to said chamber.

8. A coffee brewer for coffee vending machines and the like comprising: a brewer chamber open at its upper and lower ends, said chamber having a water inlet and a liquid coffee outlet therein; means for sealing said upper end of said chamber when coffee is being produced in said chamber; means for opening said upper end when ground coffee or the like is being supplied to said chamber, said sealing and opening means including a slide movable to a sealing position so as to cover said upper end and movable into an open position so as not to cover said end, said slide consisting of a pressure plate having an upwardly projecting extension thereon and a supporting plate positioned parallel to and upwardly of said pressure plate and having an opening therein to accommodate said extension; means for biasing said pressure plate towards said supporting plate in such a manner that said pressure plate will not contact the upper end of the chamber when said slide is being moved into the sealing position; a link having one end affixed to said slide for moving said slide into said open and said sealing positions, said link being arranged so that after said link has moved said slide into the sealing position said link will engage said extension and force said pressure plate against the upper end of said chamber; means for actuating said link, said actuating means including a shaft with a crank connected thereto and a prime mover arranged to drive said shaft, said crank being connected to the second end of said link; and means for closing and sealing the lower end of said chamber when coffee is being produced therein and for opening said lower end when said chamber is being washed out.

9. A coffee brewer for coffee vending machines and the like, comprising: a brewer chamber open at its upper and lower ends, said chamber having a water inlet and a liquid coffee outlet therein; means for sealing said upper end of said chamber when coffee is being produced in said chamber; means for opening said upper end when ground coffee or the like is being supplied to said chamber, said sealing and opening means including a slide movable to a sealing position so as to cover said upper end and movable into an open position so as not to cover said end, said slide consisting of a pressure plate having an upwardly projecting screw affixed thereto and a supporting plate positioned parallel to and upwardly of said pressure plate and having an opening therein to accommodate said screw; a spring positioned between the upper end of said screw and said supporting plate for biasing said pressure plate towards said supporting plate in such a manner that said pressure plate will not contact the upper end of the chamber when said slide is being moved into the sealing position; means for moving said slide into said open and said sealing positions; means for applying a downward force to said screw after said slide has been moved into the sealing position so as to force said pressure plate against the end of said chamber; and means for closing and sealing the lower end of said chamber when coffee is being produced therein and for opening said lower end when said chamber is being washed out.

10. A coffee brewer for coffee vending machines and the like, comprising: a brewer chamber open at its upper and lower ends, said chamber having a water inlet and a liquid coffee outlet therein; means for sealing said upper end of said chamber when coffee is being produced in said chamber; means for opening said upper end when ground coffee or the like is being supplied to said chamber, said sealing and opening means including a slide movable to a sealing position so as to cover said upper end and movable into an open position so as not to cover said end, said slide including a pressure plate which is movable vertically a limited amount and which has an upwardly projecting extension thereon; means for biasing said pressure plate in an upwardly direction away from said upper end so that said pressure plate will not contact said upper end when said slide is being moved into the sealing position; means for moving said slide into said open and sealing positions, said moving means including a link affixed to said slide and arranged so that after said link has moved said slide into the sealing position said link will engage said extension and force said pressure plate against said upper end; and means for closing and sealing the lower end of said chamber when coffee is being produced therein and for opening said lower end when said chamber is being washed out.

11. A coffee brewer for coffee vending machines and the like, comprising: a brewer chamber open at its upper and lower ends, said chamber having a water inlet and a liquid coffee outlet therein; means for sealing said upper end of said chamber when coffee is being produced in said chamber; means for opening said upper end when ground coffee or the like is being supplied to said chamber, said sealing and opening means including a slide movable to a sealing position so as to cover said upper end and movable into an open position so as not to cover said end, said slide consisting of a channel-shaped supporting plate having a transverse opening therein and a pressure plate positioned parallel to and downwardly of said channel member so as to be contained between the flanges of said channel; a screw affixed to said pressure plate and projecting upwardly through the opening in said channel; means for biasing said pressure plate towards said channel in such a manner that said pressure plate will not contact said upper end when said slide is being moved into the sealing positions; means for moving said slide into said open and said sealing positions, said moving means including a link affixed to said channel and arranged so that after said link has moved said slide into the sealing position said link will engage the upper end of said screw and force said pressure plate downwardly against said upper end; and means for closing and sealing the lower end of said chamber when coffee is being produced therein and for opening said lower end when said chamber is being washed out.

12. A coffee brewer for coffee vending machines and the like, comprising: a vertically disposed brewer chamber open at its upper and lower ends and mounted within a horizontally disposed flat mounting plate in such a manner that the top edge of said chamber projects slightly above the surface of said mounting plate, said chamber having a water inlet and a liquid coffee outlet therein; means for sealing said upper end when coffee is being produced in said chamber; means for opening said upper end when ground coffee or the like is being supplied to said chamber, said sealing and opening means comprising a slide mounted for sliding movement upon the upper surface of said mounting plate and movable to a sealing position so as to cover said upper end and movable to an open position so as not to cover said end, said slide including a pressure plate which is movable vertically a limited amount and has an upwardly projecting extension thereon; means for biasing said pressure plate in an upwardly direction away from said upper end so that said pressure plate will not contact said top edge when said slide is being moved into the sealing position; means for moving said slide into said open and said sealing positions, said moving means including a link affixed to said slide and arranged so that after said link has moved said slide into the sealing position said link will engage said extension and force said pressure plate downwardly against said top edge so as to seal said upper end; and means for closing and sealing the lower end of said chamber when coffee is being produced therein and for opening said lower end when said chamber is being washed out.

13. A coffee brewer for coffee vending machines and the like, comprising: a vertically disposed brewer chamber open at its upper and lower ends and mounted within a horizontally disposed flat mounting plate in such a manner that the top edge of said chamber projects slightly above the surface of said mounting plate, said chamber having a water inlet and a liquid coffee outlet therein; means for sealing said upper end when coffee is being produced in said chamber; means for opening said upper end when ground coffee or the like is being supplied to said chamber, said sealing and opening means comprising a slide mounted for sliding movement upon the surface of said mounting plate and movable to a sealing position so as to cover said upper end and movable into an open position so as not to cover said end, said slide consisting of a channel-shaped supporting plate which has a transverse opening therein and is disposed with its flanges in contact with said mounting plate for sliding movement thereon and a pressure plate positioned beneath said supporting plate so as to be accommodated between said flanges; a screw affixed to said pressure plate and projecting upwardly through the opening in said channel; means for biasing said pressure plate towards said channel in such a manner that said pressure plate will not contact said upper edge when said slide is being moved into the sealing position; means for moving said slide into said open and said sealing positions, said moving means including a link affixed to said channel and arranged so that after said link has moved said slide into the sealing position said link will engage the top of said screw and force said pressure plate against said top edge so as to seal said upper end; and means for closing and sealing the lower end of said chamber when coffee is being produced therein and for opening said lower end when said chamber is being washed out.

14. A coffee brewer for coffee vending machines comprising: a brewer chamber constructed to receive coffee grounds in location therein to be infused; impermanent closures for the opposite ends of said chamber; means for alternately moving said closures into closing relationship to the respective ends of said chamber to permit admission of fresh coffee grounds thereto and discharge of spent grounds therefrom; a fixed infusion water inlet tube extending into said chamber at a point spaced from said coffee grounds infusion location, said tube having a narrow slit therein facing away from the coffee grounds location whereby infusion water admitted under pressure through said tube will be sprayed into the chamber in direction away from such location and will reach the latter only indirectly; and an outlet for the brewed coffee so disposed in relation to said coffee grounds infusion location that water admitted under pressure from said inlet tube must pass through said location to said outlet when the coffee grounds discharge end of said chamber is closed.

15. A coffee brewer for coffee vending machines comprising: a brewer chamber constructed to receive coffee grounds in location therein to be infused; impermanent closures for the opposite ends of said chamber; means for alternately moving said closures into closing relationship to the respective ends of said chamber to permit admission of fresh coffee grounds thereto and discharge of spent grounds therefrom; a fixed infusion water inlet tube extending into said chamber at a point spaced from said coffee grounds infusion location, said tube having a narrow slit therein facing away from the coffee grounds location whereby infusion water admitted under pressure through said tube will be sprayed into the chamber in direction away from such location and will reach the latter only indirectly; and a screened outlet for the brewed coffee so disposed in relation to said coffee grounds infusion location and the discharge end of said chamber that water admitted under pressure from said inlet tube must pass through said location to said outlet tube when the coffee grounds discharge end of said chamber is closed and that continued flow of such water when said coffee grounds discharge end of said chamber is open will flush and clean said screened outlet for the brewed coffee.

References Cited in the file of this patent

UNITED STATES PATENTS

| | | |
|---|---|---|
| 362,086 | Irlbacker | May 3, 1887 |
| 918,765 | Miller | Apr. 20, 1909 |
| 1,190,381 | Cook | July 11, 1916 |
| 1,467,778 | Paola | Sept. 11, 1923 |
| 1,731,409 | Fitts | Oct. 15, 1929 |
| 1,952,915 | Evleth | Mar. 27, 1934 |
| 2,515,137 | Schall et al. | July 11, 1950 |
| 2,750,871 | Landgraber et at. | June 19, 1956 |
| 2,827,845 | Richeson | Mar. 25, 1958 |
| 2,971,454 | Hill | Feb. 14, 1961 |